June 18, 1963  C. H. COLLETT  3,094,360
SPLIT PROTECTOR FOR WELL PIPE
Filed Jan. 27, 1961
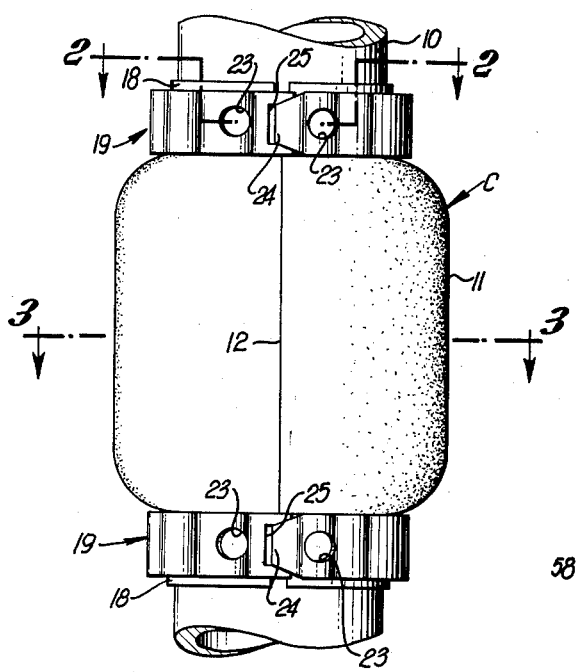
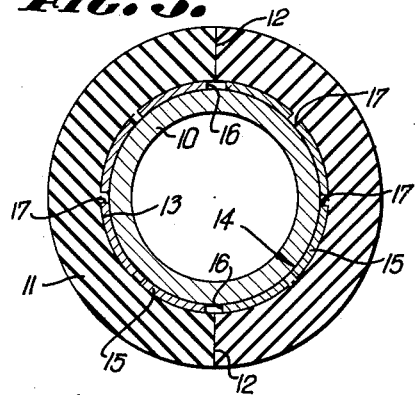
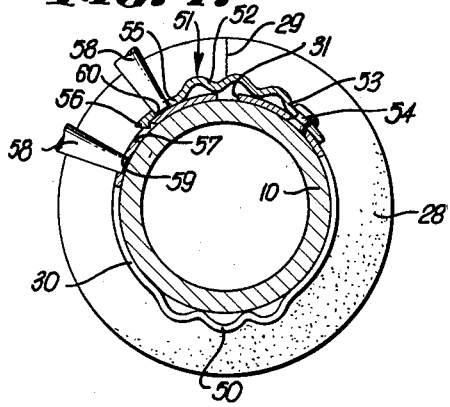
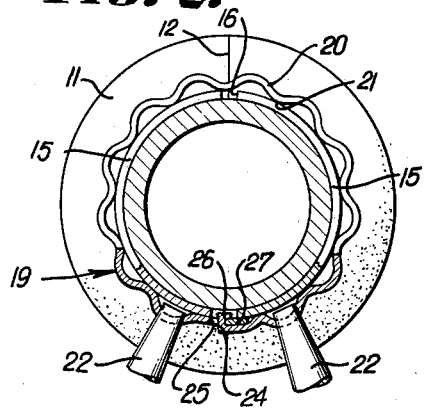
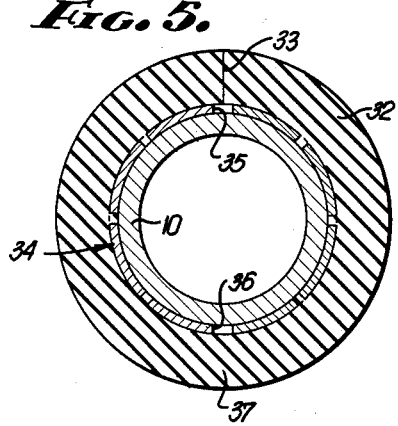
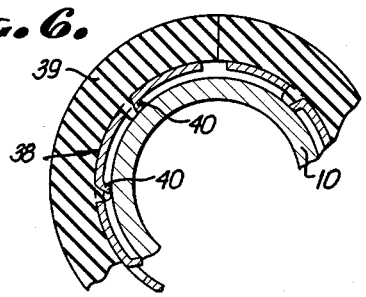
INVENTOR.
CHARLES H. COLLETT
BY
ATTORNEYS.

United States Patent Office 3,094,360
Patented June 18, 1963

3,094,360
SPLIT PROTECTOR FOR WELL PIPE
Charles H. Collett, P.O. Box 411, Menlo Park, Calif.
Filed Jan. 27, 1961, Ser. No. 85,229
13 Claims. (Cl. 308—4)

This invention relates generally to improvements in well pipe protectors, and more particularly concerns novel protectors of the type having a split elastomeric body laterally applicable to rotary drill pipe to prevent metal-to-metal contact and excessive wear of the drill pipe and casing.

In the past drill pipe protector collars or sleeves have been made in the form of a tubular rubber body externally sized to be larger in diameter than the tool joints, and having and relying upon rubber-to-metal contact with the pipe to hold the protector in place. Because of low coefficient of friction between engaged rubber and metal surfaces, reliance has been placed upon stretching, or circularly tensioning the rubber protector body about the pipe to resist relative movement of the applied protector. Common experience has been that under the severe conditions of usage in wells, the usual protector sleeves tend to become displaced along the pipe away from the tool joints to be protected, and sometimes to become stripped from the pipe.

A major object of the invention is to incorporate in elastomeric well pipe protector bodies, metallic gripping means directly engageable with the pipe surface to provide metal-to-metal contact capable of fixing the protector in its applied position more securely, the gripping means being locally exposed at opposite ends of the body so as to receive local force application acting to hold the gripping means in tight metal-to-metal engagement with the pipe. Such local exposure of the gripping means at opposite ends of the elastomeric body facilitates ready application and connection of the protector to the pipe, since for example flexible tension clamps may be tightened about the locally exposed gripping means without any manipulation of the elastomeric body.

The invention further contemplates the embodiment of these features in protectors with elastomeric body means having generally longitudinally endwise split tubular extent, adapting the body to be placed laterally about the pipe. In addition, the protectors may have metallic gripping means carried with the elastomeric body, and having generally endwise split sleeve extent, which sleeves may include gripping projections at the inside thereof, the projections being engageable with the pipe and capable of flexing in response to increasing local force application to the locally exposed metallic sleeve sections. Finally, the elastomeric body may comprise two half sections each carrying a section of the split metallic sleeve, or the elastomeric body may contain only a single lengthwise split, and the gripping sleeve may then contain either one or two lengthwise splits, all as will be described in greater detail.

All the above mentioned as well as additional features and objects of the invention will be understood more fully and to best advantage from the following detailed description of certain illustrative embodiments shown by the accompanying drawings, of which:

FIG. 1 is a side elevation showing one embodiment of the invention installed on a drill pipe;
FIG. 2 is a transverse section on line 2—2 of FIG. 1;
FIG. 3 is an enlarged section taken on line 3—3 of FIG. 1;
FIG. 4 is a view like FIG. 2 with certain modifications;
FIG. 5 is a view like FIG. 3 with certain modifications; and
FIG. 6 is a fragmentary view like FIG. 3 showing a modified gripping sleeve.

Referring first to FIGS. 1 through 3, the drill pipe 10 is equipped with a protective collar generally indicated at C, which may be positioned close to a usual tool joint, not shown. A protector comprises a generally tubular body 11 of rubber or equivalent elastomeric material larger in outside diameter than the tube joint to keep the drill string from direct contact with the surrounding casing. The body 11 is furthermore shown in FIG. 3 as comprising two semi-cylindrical or half sections formed by two diametrically opposite splits 12 which run generally endwise or longitudinally of the body. Accordingly, the protector body sections may be applied about the pipe 10 at any desired location therealong.

Bonded to the bore or inner cylindrical surface 13 of each body section is a metallic pipe gripping means 14 having generally endwise split sleeve extent. As best shown in FIG. 3, the means 14 comprises two semi-cylindrical sleeve sections 15 separated by diametrically opposite splits 16 which run generally lengthwise of the protector, in registration with the body splits 12. Accordingly, each sleeve half section is carried by and within each body half section so that the sleeve sections are brought into metal-to-metal contact with the pipe surface when the body sections are closed about the pipe. A series of openings 17 may be formed in the sleeve sections as illustrated in order to lock the sleeve sections to the rubber body if and when the latter is molded against the sleeve sections. On the other hand, a suitable adhesive can be used to cement the sleeve sections to the rubber body sections.

FIG. 1 shows the gripping means 14, and particularly the sleeve sections, to be locally exposed at opposite ends of the body 11 at locations 18 which are easily accessible for clamping the sleeve sections about the pipe. As is clear from FIG. 1, the locations 18 are everywhere within endwise projection of a cylinder defined by the outer periphery of the body means 11. One means for locally applying force acting to hold the sleeve sections in tight engagement with the pipe is shown at 19 to comprise flexible tension clamps. The latter extend about the locally exposed sleeve extents, the clamps having sleeve engaging corrugations 20 extending endwise of the sleeve sections. The inward crests 21 of the corrugations or undulations define the inner diameter of the flexible tension clamps or bands, and may conform to the outer surface of the sleeve sections 15 for holding the latter in metal-to-metal frictional engagement with the pipe when the clamps are properly tensioned. Such tensioning may be effected by causing the jaws 22 of a tool to enter suitable openings 23 formed in and near the opposite ends of each clamp, thereafter closing the jaws toward one another to bring a tongue 24 integral with one end of the clamp into an opening 25 formed in the other end of the clamp, at which time the clamp is properly tensioned. Accordingly, an overhang 26 on the tongue 24 is received completely through the opening 25 and engages the underside of the clamp extent 27 whereby the clamp may then be released only after manipulation of the jaws 22 to permit withdrawal of the tongue 24 outwardly through the opening 25. It will be understood in this connection, that when the flexible bands or clamps 19 are interlocked about the sleeve sections exposed at opposite ends of the body 11, the sleeve sections will be urged into desired frictional engagement with the pipe so as to hold the protector thereto, all without manipulation such as stretching of the rubber body 11.

FIG. 4 shows a rubber body 28 containing only a single endwise split 29, and carrying a metallic gripping sleeve 30 which also contains only one split 31. The latter is in registration with the body split 29, facilitating application of the protector to drill pipe when the body and sleeve have been spread apart to open up the splits thereby to receive the pipe therethrough.

In FIG. 4, the exposed end of the sleeve 30 is locally corrugated at 50, to permit circular elongation or tension take-up of the sleeve generally diametrically opposite the split 31, in response to clamping of the sleeve end portion. Such clamping is provided for by a clip 51 typically in the form of a relatively short length metallic band or strap. The clip is shown as having corrugated extent 52 overlying the sleeve split 31, with clip extent 53 at one side of the corrugation permanently attached to the sleeve, as by a rivet 54, and clip extent 55 at the other side of the sleeve split detachably attached to the sleeve. For the latter purpose, a tongue 56 integral with sleeve extent 55 is shown as received or hooked into an opening 57 in the sleeve, necessary hoop stretching of the sleeve and clip to secure the attachment being provided by manipulation of jaws 58 receivable into openings 59 and 60 in the sleeve and clip.

FIG. 5 shows another form of the invention wherein the body 32 contains but one lengthwise split 33, as in FIG. 4. On the other hand, the metallic gripping sleeve 34 is in two semi-cylindrical sections which contain splits 35 and 36 therebetween, the splits running lengthwise of the body. Furthermore, the split 35 is in registration with the body split 33, facilitating application of the protector to a pipe. In this connection, when the splits 33 and 35 are spread, the rubber body 32 flexes in the region 37 lying outwardly of the sleeve split 36.

Finally, reference to FIG. 6 will show the metallic sleeve 38 carried within the rubber body 39 to have gripping projections 40 at the inside of the sleeve. Projections may be struck out from the sleeve, and they are engageable with the pipe 10 and sized to flex in response to increasing local force application to the sleeve extent exposed at opposite ends of the protector body 39. In other respects, the sleeve 38 may contain either one or two lengthwise splits, as described above. The gripping edges of the projections 40 may be more or less sharp so that in their resistance to axial displacement of the protector they tend to bite into the pipe. In his respect, the projecions are turned inwardly sufficiently so as to remain in gripping and penetrating engagement with the pipe regardless of the degree of flexure of the projections.

I claim:

1. A well pipe protector, comprising generally endwise split tubular elastomeric body means adapted to be placed about the pipe, metallic gripping means carried within said body means to extend generally lengthwise thereof for engagement against the pipe, said gripping means being locally exposed at opposite ends of said body means, said body means being bonded to said gripping means and said local exposure of the gripping means being everywhere within endwise projection of a cylinder defined by the outer periphery of said body means, and other means at opposite ends of said body means for locally applying force acting to hold said gripping means in tight engagement with the pipe.

2. A well pipe protector, comprising generally endwise split tubular elastomeric body means adapted to be placed about the pipe, metallic gripping means in the form of a generally endwise split sleeve carried within said body means to extend generally lengthwise thereof for engagement against the pipe, said body means being bonded to said gripping means and said local exposure of the gripping means being everywhere within endwise projection of a cylinder defined by the outer periphery of said body means, said gripping means being locally exposed at opposite ends of said body means, and other means at opposite ends of said body means for locally applying force acting to hold said gripping means in tight engagement with the pipe.

3. The invention as defined in claim 2 in which said gripping means includes gripping projections at the inside of said split sleeve, said projections being engageable with the pipe and sized to flex in response to increasing local force application to said gripping means exposed at opposite ends of said body means.

4. The invention as defined in claim 2 in which said other means includes flexible tension clamps extending about said gripping means exposed at opposite ends of said body means.

5. The invention as defined in claim 4 in which said tension clamps have sleeve engaging corrugations extending endwise of said gripping means.

6. The invention as defined in claim 5 in which each clamp has near its ends shoulders engageable by a tool to constrict the clamp about said exposed gripping means.

7. The invention as defined in claim 6 in which each clamp has a coupling engageable and releasable at the clamp ends when the clamp is constricted about the exposed gripping means.

8. The invention as defined in claim 2 in which said body means comprises two half sections.

9. The invention as defined in claim 4 in which said gripping means sleeve contains a single endwise split, and said tubular body means also contains a single endwise split in lateral registration with said sleeve split.

10. The invention as defined in claim 4 in which said gripping means sleeve contains two endwise splits whereby said sleeve is in two sections, and said tubular body means contains a single endwise split in lateral registration with one of said sleeve splits.

11. The invention as defined in claim 2 in which said other means includes a tension clamp extending part way about said gripping means sleeve exposed at an end of said body means, said clamp being integrally connected to said sleeve at one side of said split and detachably connected to said sleeve at the other side of said split.

12. The invention as defined in claim 11 in which said clamp includes a metallic band that is corrugated to flex in response to tensioning of the clamp during connection and disconnection of the clamp and sleeve.

13. The invention as defined in claim 12 in which the sleeve is corrugated to flex in response to tensioning of the sleeve during connection and disconnection of the clamp and sleeve.

References Cited in the file of this patent

UNITED STATES PATENTS

| | | |
|---|---|---|
| 1,173,998 | Depew | Feb. 29, 1916 |
| 1,552,888 | Smith | Sept. 8, 1925 |
| 2,251,253 | Miller | July 29, 1941 |
| 2,368,415 | Grant | Jan. 30, 1945 |
| 2,860,013 | Medearis | Nov. 11, 1958 |
| 2,877,062 | Hall | Mar. 10, 1959 |
| 2,959,453 | Jacobs | Nov. 8, 1960 |